T. M. MARCY.
Wagon Body.

No. 84,892.

Patented Dec. 15, 1868.

Witnesses
Geo. W. Tibbitts
Geo. Hester

Inventor
T. M. Marcy

THOMAS M. MARCY, OF WINDHAM, OHIO.

Letters Patent No. 84,892, dated December 15, 1868.

WAGON-BOX.

The Schedule referred to in these Letters Patent and making part of the same.

*To all whom it may concern:*

Be it known that I, THOMAS M. MARCY, of Windham, in the county of Portage, and State of Ohio, have invented a certain new and useful Wagon-Box; and I do hereby declare that the following is a full and complete description of the same, reference being had to the accompanying drawings, making a part of this specification, in which—

Like letters of reference refer to like parts in the views.

Figure 1:
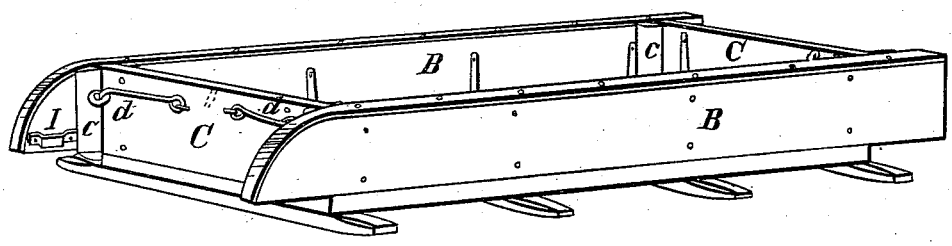
Figure 1 is a perspective view.

The nature of this invention consists in the construction and arrangement of a wagon-box, whose sides and ends are secured by hinges to the bottom, by which means the box may be readily converted into a platform suitable for a hay-rack, or a truck for a moving wagon.

In the drawing—

Figure 2:
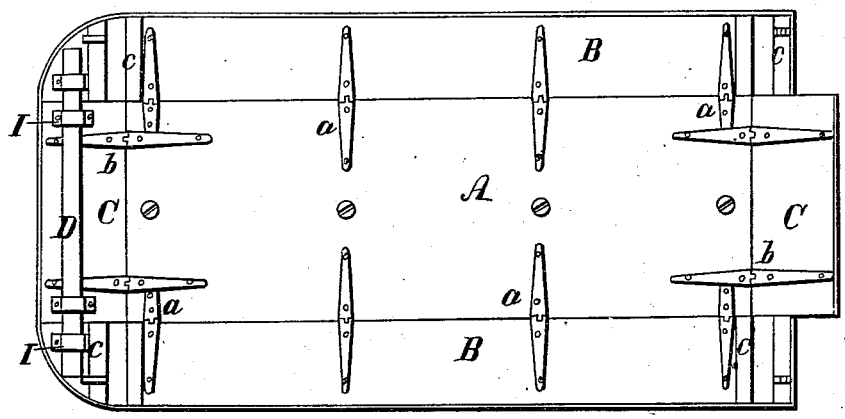
Figure 2 is a plan view.

A represents the bottom or centre-piece of the box, which, together with the sides and ends, is constructed in the ordinary manner, with the exception that the ends and sides are hinged to the bottom, as shown in fig. 2; the sides B, with the hinges $a$, and the ends C with the hinges $b$.

This invention, when used for a wagon-box, is shown in fig. 1, the sides and ends being closed or turned up, as represented.

The ends are first closed, and then the sides, each end of the said sides being provided with the ribs $c\ c$, which pass each side of the end-pieces, and thus hold them in place, the sides being held up by means of the hooks and rings $d$, fig. 1.

A spring, as in ordinary wagons, may be used, if desired, in place of the hooks and rings.

The object of having the sides and ends hinged is to convert the wagon into a platform for a hay-rack or a truck for moving wagons.

The hooks $d\ d$ are relieved, and the sides and ends thrown down, a plan view of the wagon-box in this position being shown in fig. 2.

The said platform is made firm and steady by means of the bar D, which is passed through loops or staples I, in the end and sides of the box, as shown.

By this means a very durable platform is obtained for a moving wagon, and a rack for hay, the sides and ends, when turned up, forming a most convenient and suitable wagon-box.

What I claim as my invention, and desire to secure by Letters Patent, is—

The sides B B, ends C C, hinged to the bottom or centre-piece A, each and all being constructed, arranged, combined, and operating together in the manner and for the purpose as specified and set forth.

TH'S M. MARCY.

Witnesses:
    GEO. W. TIBBITTS,
    GEO. HESTER.